(12) United States Patent
Woelfing et al.

(10) Patent No.: US 10,261,229 B2
(45) Date of Patent: Apr. 16, 2019

(54) LIGHTING DEVICE WITH LIGHT GUIDING SIDE-EMITTING FIBER BUNDLE

(71) Applicant: SCHOTT AG, Mainz (DE)

(72) Inventors: Bernd Woelfing, Mainz (DE); Hubertus Russert, Jugenheim (DE); Juergen Meinl, Hohenstein-Holzhausen (DE); Jia Guo, Nanjing (CN)

(73) Assignee: SCHOTT AG, Mainz (DE)

( * ) Notice: Subject to any disclaimer, the term of this patent is extended or adjusted under 35 U.S.C. 154(b) by 48 days.

(21) Appl. No.: 15/135,167

(22) Filed: Apr. 21, 2016

(65) Prior Publication Data

US 2016/0313486 A1 Oct. 27, 2016

(30) Foreign Application Priority Data

Apr. 21, 2015 (DE) .................. 10 2015 106 049

(51) Int. Cl.
*F21V 8/00* (2006.01)
*G02B 6/04* (2006.01)

(52) U.S. Cl.
CPC .......... *G02B 6/0006* (2013.01); *G02B 6/001* (2013.01); *G02B 6/04* (2013.01)

(58) Field of Classification Search
CPC .... G02B 6/4292; G02B 6/001; G02B 6/0006; G02B 6/262; G02B 6/3624; G02B 6/3628; G02B 6/3632; G02B 6/3664; G02B 6/3668; B60Q 3/62–3/68; F21S 48/2237; F21S 48/2268; F21S 48/2281; F21S 41/24; F21S 41/29; F21S 43/236; F21S 43/237; F21S 43/242; F21S 43/243; F21S 43/245; F21S 43/247; F21S 43/249; F21S 43/251; F21S 43/27
See application file for complete search history.

(56) References Cited

U.S. PATENT DOCUMENTS

| | | | |
|---|---|---|---|
| 4,147,402 A | 4/1979 | Chown | |
| 5,042,892 A | 8/1991 | Chiu et al. | |
| 5,053,929 A | 10/1991 | Le Gars | |
| 5,300,162 A | 4/1994 | Brockmeyer et al. | |
| 5,341,445 A | 8/1994 | Davenport et al. | |
| 6,595,673 B1 | 7/2003 | Ferrante et al. | |
| 2003/0042493 A1* | 3/2003 | Kazakevich | A61B 1/0607 257/98 |
| 2005/0013554 A1 | 1/2005 | Killer et al. | |
| 2005/0173719 A1 | 8/2005 | Yonekubo | |
| 2005/0251119 A1 | 11/2005 | Eaton et al. | |

(Continued)

FOREIGN PATENT DOCUMENTS

| | | |
|---|---|---|
| CN | 1655052 | 8/2005 |
| DE | 69005011 | 6/1994 |

(Continued)

OTHER PUBLICATIONS

Mitschke, "Glass Fibers Physics and Technology", Elsevier Spektrum, Heidelberg, 2005, with English translation, 24 pages.

*Primary Examiner* — Anh T Mai
*Assistant Examiner* — Steven Y Horikoshi
(74) *Attorney, Agent, or Firm* — Ohlandt, Greeley, Ruggiero & Perle, L.L.P.

(57) ABSTRACT

A lighting device having a side-emitting fiber bundle is provided. The fiber bundle is inserted in a sleeve that has an extension, which is effective as a light mixer.

5 Claims, 5 Drawing Sheets

(56) References Cited

U.S. PATENT DOCUMENTS

| | | | |
|---|---|---|---|
| 2008/0025039 A1* | 1/2008 | Guillermo | A42B 3/044 362/556 |
| 2008/0239748 A1* | 10/2008 | Hatzenbuehler | G02B 6/0006 362/554 |
| 2009/0185392 A1* | 7/2009 | Krupa | A61B 1/0653 362/553 |
| 2011/0037956 A1 | 2/2011 | Lin et al. | |
| 2011/0103757 A1 | 5/2011 | Alkemper et al. | |
| 2011/0182552 A1 | 7/2011 | Russert et al. | |
| 2011/0292660 A1* | 12/2011 | Eichelberger | G02B 6/0006 362/311.02 |
| 2014/0241005 A1 | 8/2014 | Jones | |
| 2015/0138826 A1* | 5/2015 | Vinther | G02B 6/4201 362/581 |
| 2015/0146450 A1* | 5/2015 | Iordache | G02B 27/1006 362/555 |

FOREIGN PATENT DOCUMENTS

| | | |
|---|---|---|
| DE | 102007014871 | 10/2008 |
| DE | 102008044938 | 3/2010 |
| DE | 102010046342 | 3/2012 |
| DE | 102011119972 | 6/2013 |
| EP | 0562873 | 9/1993 |
| JP | H04326306 | 11/1992 |
| JP | 2004335199 | 11/2004 |
| WO | 2009100834 | 8/2009 |
| WO | 2011147877 | 12/2011 |

\* cited by examiner

LIGHTING DEVICE WITH LIGHT GUIDING SIDE-EMITTING FIBER BUNDLE

CROSS REFERENCE TO RELATED APPLICATIONS

This application claims benefit under 35 U.S.C. § 119(a) of German Patent Application No. 10 2015 106 049.3 filed Apr. 21, 2015, the entire contents of which are incorporated herein by reference.

BACKGROUND

1. Field of the Invention

The invention relates to a lighting device comprising a side-emitting light guide. More particularly, the invention relates to a lighting device that comprises an LED and in which the light from the LED is injected into a side-emitting fiber bundle. Such lighting devices are applied especially in the automotive sector as an ambience lighting. The invention further relates to a sleeve that is used to terminate a side-emitting fiber bundle and to inject the light from an LED into the fiber bundle.

2. Description of Related Art

Lighting devices with side-emitting light guides are known from practice. These are in particular lighting devices in which the light from a semiconductor light source, in particular an LED, is injected into a bundle of side-emitting glass or plastic fibers. Basically, a light guiding fiber is mostly made up of a light-guiding core that is surrounded by a covering material (cladding) of a lower refractive index.

At the core-cladding interface, total reflection occurs so that the light is guided along the fiber. For emitting light laterally along an extended length, for lighting applications, side-emitting fibers are known in which the light-guiding core includes scattering particles, for example, or in which the cladding includes defect sites at which the light is emitted sideways. Such side-emitting light guides in particular consist of a glass fiber bundle inserted in a plastic tube. Such a glass fiber bundle inserted in a tube is flexible and can for example be installed in a vehicle as an ambient lighting. In this case, the LEDs are usually accommodated in a housing from which the glass fiber bundle inserted in a tube extends into the vehicle.

For injecting the light from the LEDs into the fiber bundle, it has been known to embed the end of the fiber bundle in a covering material which is cured. Then, the end of the wrapped fiber bundle is cut off and polished, so that a light entrance surface is created. This procedure is very cost and time consuming.

German patent DE 10 2008 044 938 B4 (Schott AG), by contrast, provides a method in which light guiding fibers are inserted into a sleeve which is filled with an adhesive. The adhesive is cured and the light is injected into the fiber cores through the transparent adhesive.

However, for side-emitting ambiance lighting it has been found that inhomogeneities in the color distribution of the light occur.

This particularly applies to the case in which the employed light source is a so-called RGB light source. Such light sources are for example implemented as an LED chip. In this case, three LEDs of different colors are arranged close to each other on the chip.

In conventional injection methods, the light from these LEDs will be injected into the individual fibers with different intensity. These inhomogeneities in intensity distribution, in turn, combine with the usually existing inhomogeneities of the proportion of light that is emitted sideways.

Even small color changes are perceived by the human eye.

SUMMARY

The invention is therefore based on the object of at least mitigating the aforementioned drawbacks of the prior art.

More particularly, it is an object of the invention to provide a simple way in which inhomogeneities of a side-emitting light source as described above can be reduced. At the same time, coupling efficiency should not be degraded significantly.

The object of the invention is achieved by a lighting device and by a sleeve for a lighting device as disclosed herein.

The invention relates to a lighting device which is in particular intended for vehicles.

The lighting device comprises at least one side-emitting fiber bundle.

Preferably, the fiber bundle is a glass fiber bundle inserted in a tube made of an elastic material, in particular a transparent plastic. The fiber bundle emits sideways, at least partially.

For coupling the light from a light source, especially an LED, into the fiber bundle, the fiber bundle is inserted in a sleeve, and light from a light source is injected into the side-emitting fiber bundle through the sleeve.

For this purpose, the sleeve which is preferably at least partially made of transparent material has a cup-like shape, at least in portions thereof.

Preferably, the fiber bundle with the tube removed but not polished, is introduced into the sleeve pre-filled with a transparent adhesive, and the adhesive is cured whereby the fiber bundle is mechanically fixed at the same time, i.e. terminated. In order to improve coupling efficiency, the refractive index of the adhesive may be adapted to the refractive index of the core of the side-emitting fibers of the fiber bundle.

Furthermore, the adhesive preferably has a higher refractive index than the sleeve, so that the combination of sleeve and adhesive forms a light guide as well.

According to the invention, the sleeve has an extension at an end opposite to the fiber bundle, which is effective as a light mixer.

Thus, the light is not directly coupled into the fibers through the base of the sleeve but passes through an extension before, in which multiple total reflections will be caused so that the light of different colors is mixed, in particular when an RGB LED is used.

The extension is preferably formed integrally with the sleeve, i.e. in one piece, and may in particular be an injection molded part of plastic material.

It has been found that with such an extension inhomogeneities in intensity distribution of the different light colors can be largely avoided in a simple way. The providing of a sleeve with extension does not cause appreciable additional cost, neither in terms of manufacturing of the component nor during assembly.

It has moreover been found that coupling efficiency is hardly deteriorated, at least when the diameter of the extension is appropriately adjusted to the light source and the fiber bundle. In particular, reduction in coupling efficiency when compared to a conventional sleeve without extension can be kept at less than 10%.

The extension thereby preferably forms a light guide made of a plastic material which has a higher refractive index than air. Since the sleeve will usually be installed in a housing, it is not necessary to provide the extension with a coating of a material with a lower refractive index than that of the extension. However, such a coating is conceivable to improve the effectiveness of the extension as a light guide.

In a preferred embodiment of the invention, the extension has a polygonal cross section, at least in portions thereof. In particular, the extension is at least quadrangular, preferably pentagonal, and most preferably hexagonal. The polygonal configuration improves the mixing efficiency of the extension due to reflections at the walls in different directions.

The extension is preferably shaped so as to have a constant cross section, at least in portions thereof. However, it is as well conceivable to provide the extension with a conical shape in portions thereof, or to provide the extension with a cross-sectional shape that changes from the light source towards the sleeve.

In particular when using RGB LEDs it is conceivable, that in the vicinity of the LED the extension has a triangular or approximately triangular shape, and that towards the sleeve the shape then changes into a cross-sectional shape better adapted to the round shape of the sleeve, for example a hexagonal cross section.

With different cross-sectional areas, the extension may at the same time be adjusted to the diameters of light source and fiber bundle.

It is furthermore conceivable to provide an extension, whose geometrical shape, in portions thereof, can be described by a body having a polygonal base and a polygonal top, with the top rotated relative to the base by an angle of >0°. With an angle of the side walls changing accordingly, the incoming light will effectively be twisted and statistical scattering effects will be caused, which improve coupling efficiency.

The extension preferably has a length of more than 1.5 times the bundle diameter of the fiber bundle, particularly preferably of more than 2.5 times the bundle diameter, and of less than 7.5 times the bundle diameter, more preferably less than 5 times the bundle diameter.

It has been found that already an extension with a length of 2.5 times the bundle diameter provides fairly good mixing effectiveness. With a length of 5 times the bundle diameter, the mixing effect is further improved, however, the length should be kept to a minimum in order to keep the installation space in the housing small.

The diameter of the extension is smaller than the diameter of the rest of the adjacent sleeve.

In particular, the extension has a diameter of between 0.75 times and 1.5 times the diameter of the bundle, preferably between 1 time and 1.15 times the bundle diameter.

In particular, the extension moreover has a diameter that is from 0.75 times to 1.5 times, preferably from 1 time to 1.5 times the diameter of the light source.

It will be understood that in case of a non-circular cross-sectional shape, the diameter refers to the length of the longest line connecting two points of the cross section of the extension or the light source or the fiber bundle, respectively.

Preferably, the emitting surface of the light source is completely overlapped by the extension.

In one refinement of the invention, the extension and/or the light source comprise(s) at least one form-fitting element.

The light source is in particular implemented in form of an LED chip arranged on a circuit board. In this case, form-fitting elements in the form of bores or projections may be provided on the circuit board, for example, which engage with complementary form-fitting elements that form part of the sleeve or are connected to the sleeve.

Usually, the lighting device will have a housing into which the sleeve is inserted.

According to the prior art known from practice, such a plug-in connection likewise constitutes a form-fitting element which defines the position of the sleeve within the housing and hence relative to the light source arranged in the housing.

A further form-fitting element on the front side of the sleeve or on the extension may improve the accuracy with which the light entrance surface of the extension is positioned relative the light source. In particular, tilting of the sleeve in the housing can be largely avoided in this way.

The light entrance surface of the extension preferably is not directly placed on the light source. In this manner, direct heat transfer into the extension is in particular avoided.

Rather, preferably, a gap is provided between the light entrance surface of the sleeve or of the extension. This gap in particular has a height from 0.05 mm to 5 mm, more preferably from 0.1 mm to 1 mm.

The invention further relates to a sleeve for a lighting device as described above. The sleeve is made of a transparent plastic material. In particular, the sleeve is made of polycarbonate or polymethyl methacrylate. Other transparent resins such as cyclic olefin copolymers, etc. may be used as well.

The sleeve has a cup-shaped portion for inserting a fiber bundle. At a front end of the portion for inserting the fiber bundle, the sleeve comprises an extension of a smaller diameter, which is integrally formed with the sleeve and forms a light mixer.

The sleeve may in particular include features as described above. It will be understood that the extension is not cup-shaped or hollow but is formed of solid material.

BRIEF DESCRIPTION OF THE DRAWINGS

The invention will now be explained in more detail with reference to the exemplary embodiments illustrated in the drawing of FIGS. 1 to 7.

DETAILED DESCRIPTION

Figure 1:
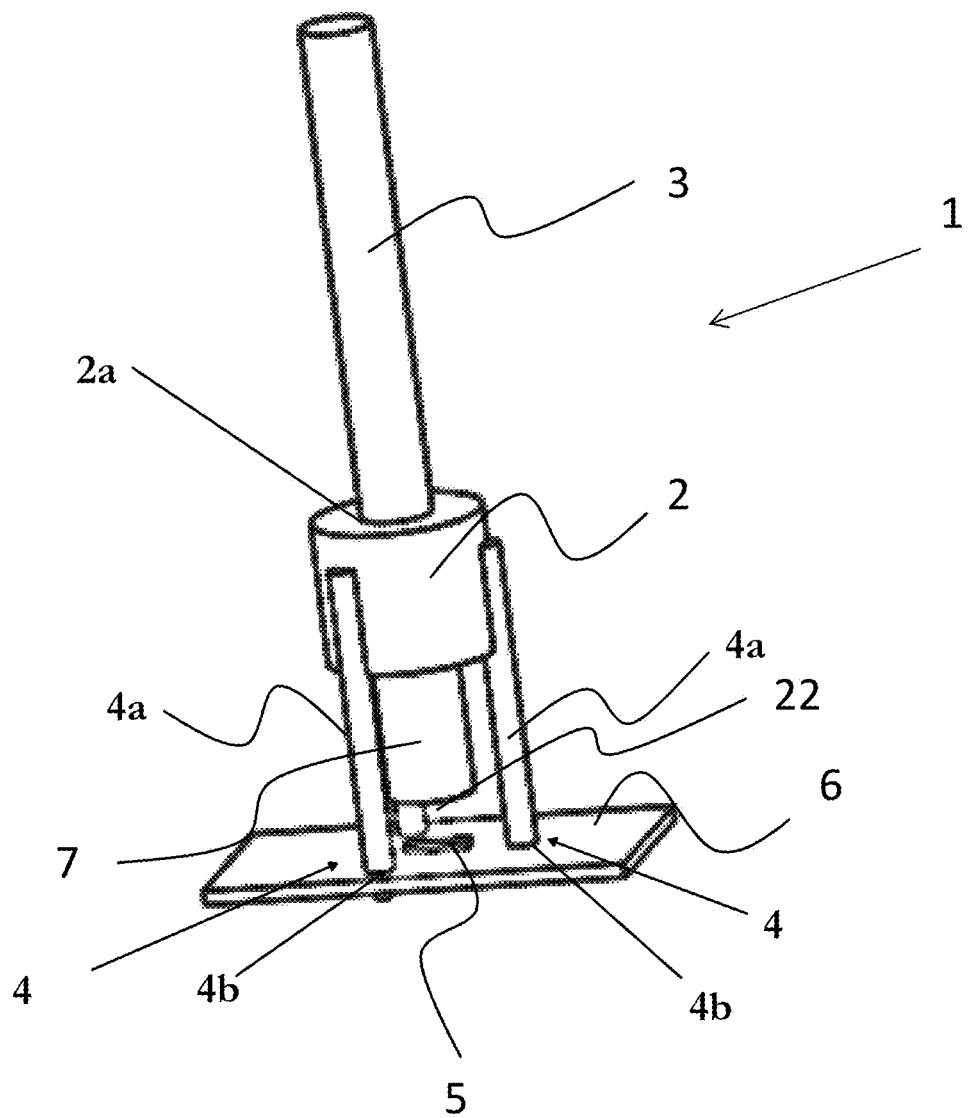
FIG. 1 and FIG. 2 each show perspective views of different embodiments of a lighting device according to the invention.

FIG. 1 shows a lighting device 1 according to a first embodiment of the invention.

Lighting device 1 comprises a side-emitting fiber bundle 3 which is inserted into a sleeve 2 and is fixed there by means of a transparent light-conducting adhesive 2a.

Sleeve 2 has an extension 7 at an end opposite to the fiber bundle 3, which in this exemplary embodiment has a cylindrical shape and which is effective as a light mixer.

In this exemplary embodiment, the light source comprises an LED 5 which in particular is implemented as an RGB chip and is arranged on a circuit board 6.

Circuit board 6 will usually be installed in a housing (not shown) into which the sleeve 2 is inserted.

Extension 7 of sleeve 2 is positioned above the LED 5 in a manner so that light from LED 5 is first coupled into the extension 7 and then via sleeve 2 into the fiber bundle 3.

Between the light entrance surface of extension 7 and the LED 5, a gap 22 is provided which prevents direct transfer of heat. In the present exemplary embodiment, sleeve 2 comprises integrally molded form-fitting elements 4. Form-fitting elements 4 may constitute an integral portion of the sleeve 2 which is preferably made by injection molding.

In this exemplary embodiment, three form-fitting elements 4 are provided, and the form-fitting elements 4 are designed as posts 4a which engage into corresponding bores 4b in circuit board 6.

Form-fitting elements 4 do not only define the position of the sleeve when the latter is inserted into the housing, but moreover ensure that the front end of sleeve 2, i.e. extension 7, is supported exactly above the LED 5, in horizontal alignment. In this manner, tilting of sleeve 2 is prevented.

Figure 2:
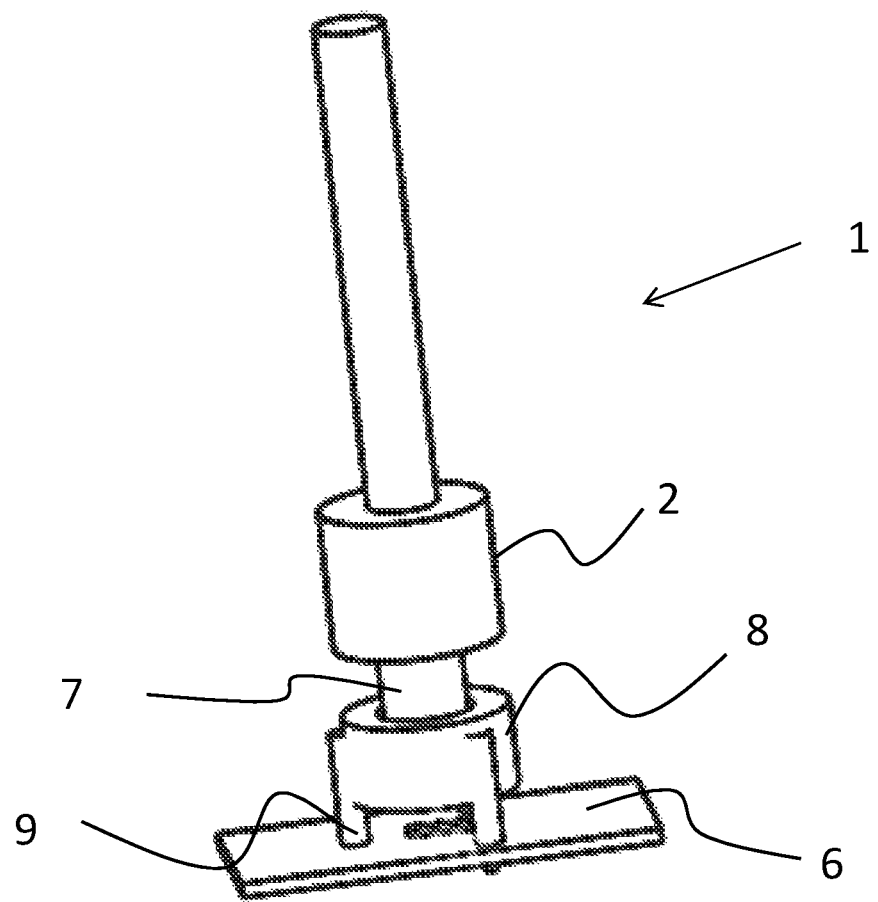

FIG. 2 shows an alternative embodiment of a lighting device 1.

As a difference to the embodiment illustrated in FIG. 1, a retaining ring 8 is provided as a form-fitting element, which itself comprises form-fitting elements 9 in the form of posts, by means of which the retaining ring 8 is placed on circuit board 6.

In this case, the extension of sleeve 2 is inserted into the retaining ring 8 and is again supported in the plane of circuit board 6, with a form-fit connection.

However, it is as well conceivable that the retaining ring 8 additionally defines a stop for the sleeve and so provides an axial form-fit connection as well.

Figure 3:
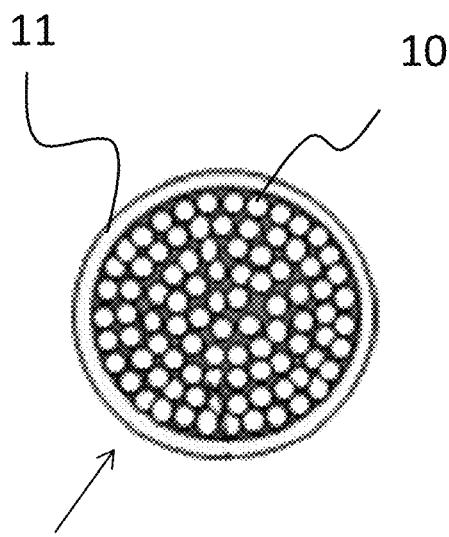
FIG. 3 shows a cross sectional view through a side-emitting fiber bundle.

FIG. 3 shows a schematic cross-sectional view of a side-emitting fiber bundle 3.

Fiber bundle 3 comprises a multitude of fibers 10 made of glass.

Fibers 10 are preferably glass fibers and usually comprise a light-guiding core which is enclosed by a cladding of a material having a lower refractive index.

The light may for example be emitted through scattering particles in the core of the fibers 10 or through defect sites in the fiber cladding.

Fibers 10 of fiber bundle 3 are inserted in a tube 11 which is usually made of an elastic synthetic material. Therefore, fiber bundle 3 is flexible.

Figure 4:
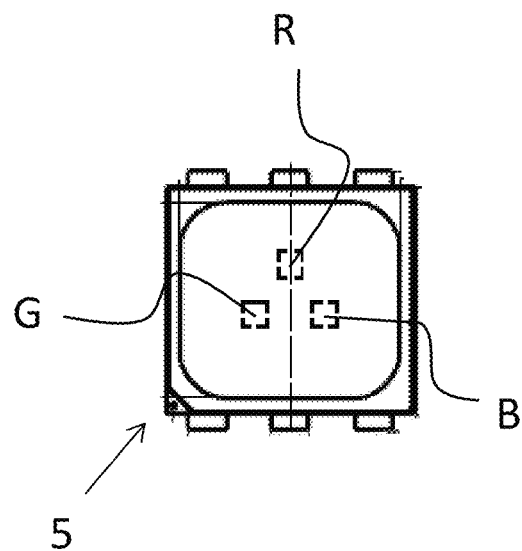
FIG. 4 shows a light source in the form of an RGB chip.

FIG. 4 shows a plan view of an LED 5 which can be used for the invention.

LED 5 is implemented as an RGB chip comprising individual LEDs in the colors G (green), R (red), and B (blue).

Figure 5:
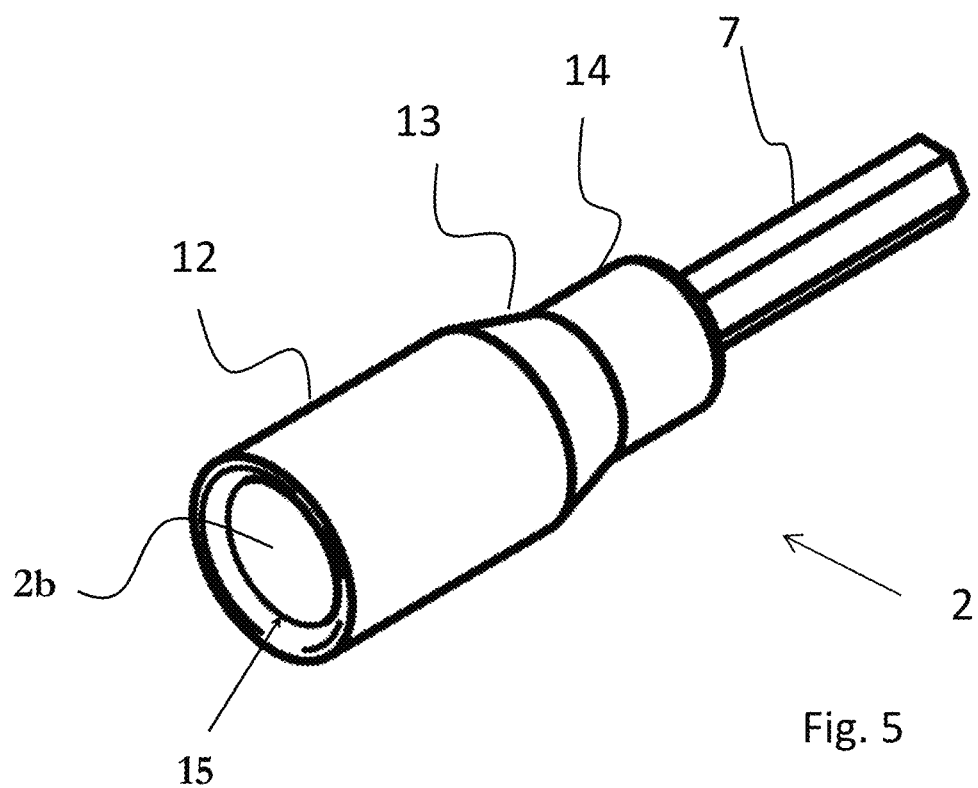
FIG. 5 and FIG. 6 are perspective views of two exemplary embodiments of a sleeve according to the invention.

FIG. 5 shows a perspective view of another embodiment of a sleeve 2.

In this embodiment, sleeve 2 comprises a portion 12 for insertion of the fiber bundle and therefore has an opening 15 at one end.

The fiber bundle, from which preferably the tube has previously been removed at the tip thereof, is inserted into the opening 15 in the sleeve which has previously been filled with an adhesive 2b. The fiber ends need not be polished for this purpose and may even assume different distances to the base of the sleeve after insertion and may be introduced without particular order.

Seen from outside, the insertion portion 12 is followed by a tapered portion 13 and a central portion 14. The tip of the sleeve 2 is formed by an extension 7 which in this embodiment has a hexagonal shape. The extension 7 has a smaller diameter than the rest of the sleeve and serves as a light mixer.

Figure 6:
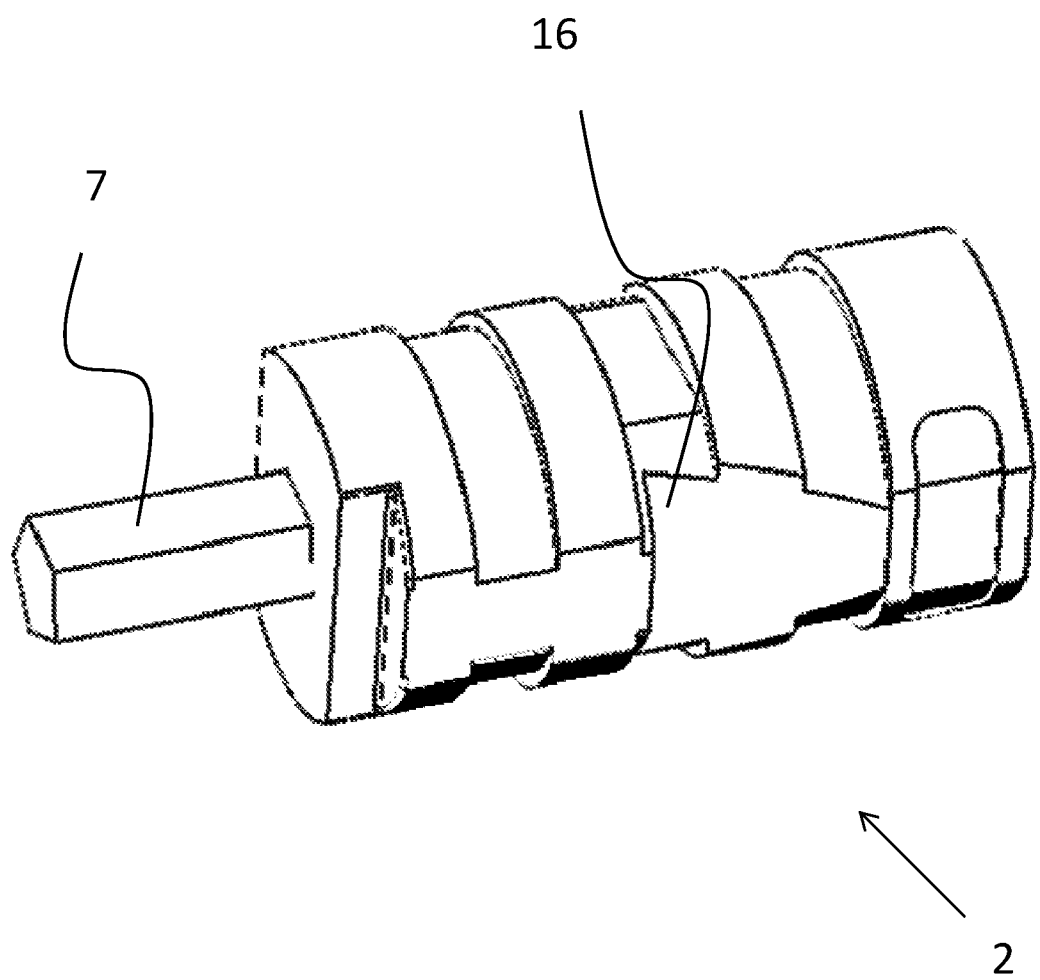

FIG. 6 shows a further embodiment of a sleeve 2. As a difference to the embodiment shown in FIG. 5, it can be seen that this sleeve exteriorly has a plurality of form-fitting/latching elements 16 for being inserted into a housing and fixed therein with a form-fit connection by being latched or rotated, for example.

Again, this sleeve 2 has an extension 7 with a hexagonal cross-sectional shape.

Figure 7:
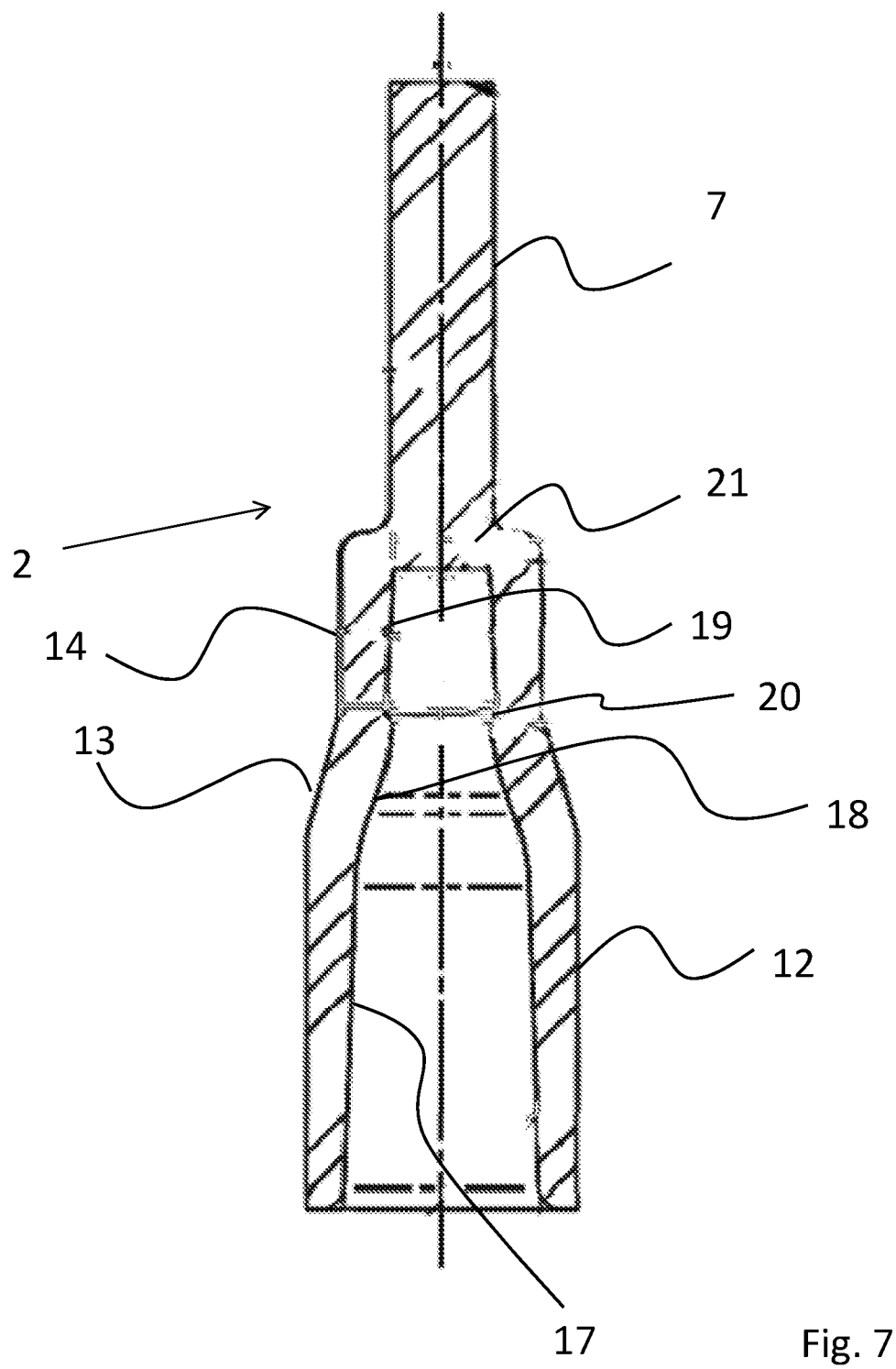
FIG. 7 is an axial sectional view of the sleeve shown in FIG. 5.

FIG. 7 shows a sectional view of the sleeve 2 illustrated in FIG. 5.

It can be seen that already the portion 12 for insertion of the fiber bundle has a tapering inside wall 17. The conical shape already in this area is intended to facilitate insertion. However, a non-conical shape is likewise conceivable.

Adjacent thereto, tapering portion 13 follows, in which the inside wall 18 tapers more strongly than that of insertion portion 12.

This portion is intended to bring together the individual fibers freed from the tube.

Adjacent to tapering portion 13, central portion 14 follows. In this portion, inside walls 19 are either parallel or tapering, but less than in portion 13. As a result, parallel alignment of the individual fibers is achieved at the top of the fiber bundle.

Further contributing to this end is the fact that in the transition area the inner diameter of portion 14 is smaller than the inner diameter of portion 13, so that a constriction 20 is formed in which the fibers are brought together.

The base 21 of sleeve 2 merges into extension 7. Extension 7 has a smaller diameter than the sleeve, in particular in the region of base 21. For the sake of mechanical stability, base 21 should have a thickness similar to the wall thicknesses of the rest of the sleeve. For efficiency, however, base 21 should not be much thicker than the wall of the sleeve.

It will be understood that the lighting device may as well have a multi-leg design, for example, or that the light may be injected into a fiber bundle on both ends thereof, for example.

The invention allows to provide a side-emitting lighting device in which a non-homogeneous color appearance can be avoided in a simple way.

LIST OF REFERENCE NUMERALS

1 Lighting device
2 Sleeve
3 Fiber bundle
4 Form-fitting element
5 LED
6 Circuit board
7 Extension
8 Retaining ring
9 Form-fitting element
10 Fiber
11 Tube
12 Insertion portion
13 Tapering portion
14 Central portion
15 Opening
16 Form-fitting/latching element
17 Inside wall
18 Inside wall
19 Inside wall
20 Constriction
21 Base
22 Gap

What is claimed is:

1. A sleeve for a lighting device, comprising:
a transparent plastic material;
an insertion portion having an inside wall for insertion of a fiber bundle, the insertion portion having a tapered portion and a central portion;
an integrally formed front end adjacent the central portion has an extension of a smaller diameter and forms a light mixer, the inside wall of the tapered portion tapering in a first region and a second region, the second region being proximate the central portion and tapering more strongly than the first region, the inside walls of the central portion being either parallel or tapering less than the second region.

2. The sleeve as claimed in claim 1, further comprising a constriction in the inner walls between the second region and the central portion.

3. The sleeve as claimed in claim 1, further comprising, exteriorly, a plurality of form-fitting/latching elements.

4. A lighting device, comprising:
a light source emitting light;
at least one side-emitting fiber bundle; and
a sleeve having a first end and a second, opposite end, the fiber bundle being in the sleeve with light from the light source coupled into the side-emitting fiber bundle via the first end, the second end having an extension that forms a light mixer, wherein the extension and the sleeve are formed integrally,
wherein the sleeve is made of a transparent plastic material and the first end has a portion for insertion of the at least one fiber bundle,
wherein the second end has a smaller diameter than the portion, is integrally formed with the sleeve, and forms the light mixer, and
wherein the first end comprises an insertion portion having an inside wall for insertion of a fiber bundle, the insertion portion having a tapered portion and a central portion, the inside wall of the tapered portion tapering in a first region and a second region, the second region being proximate the central portion and tapering more strongly than the first region, the inside walls of the central portion being either parallel or tapering less than the second region.

5. The lighting device as claimed in claim 4, further comprising a constriction in the inner walls between the second region and the central portion.

* * * * *